US008098391B2

(12) United States Patent
Kiplinger et al.

(10) Patent No.: US 8,098,391 B2
(45) Date of Patent: Jan. 17, 2012

(54) DOCUMENT PROCESSING SYSTEM HAVING IMPROVED OPERATIONAL SEQUENCING

(75) Inventors: Michael John Kiplinger, Kalamazoo, MI (US); David Brian Tratar, Dearborn, MI (US); Michael A. Saunders, Northville, MI (US); Michael James Spall, Commerce, MI (US); Johan P. Bakker, Brighton, MI (US); Paul John McCarthy, Commerce, MI (US); Gary Benton Copenhaver, Canton, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 839 days.

(21) Appl. No.: 12/140,369

(22) Filed: Jun. 17, 2008

(65) Prior Publication Data

US 2009/0123055 A1 May 14, 2009

Related U.S. Application Data

(60) Provisional application No. 61/002,824, filed on Nov. 12, 2007.

(51) Int. Cl.
*G06F 3/12* (2006.01)

(52) U.S. Cl. ....... 358/1.15; 358/448; 358/488; 358/501; 382/139; 382/182; 382/137; 400/105; 400/78; 271/302

(58) Field of Classification Search .................. 358/474, 358/488, 501, 498, 497, 496; 382/139, 182, 382/497, 137, 1.15; 400/105, 73, 708; 271/302, 271/8.1, 303
See application file for complete search history.

(56) References Cited

U.S. PATENT DOCUMENTS

| | | | | |
|---|---|---|---|---|
| 3,764,978 | A * | 10/1973 | Tyburski et al. | 382/318 |
| 4,088,982 | A * | 5/1978 | Haas | 382/137 |
| 4,745,265 | A * | 5/1988 | Douno et al. | 235/379 |
| 5,095,371 | A * | 3/1992 | Tanaka et al. | 358/300 |
| 6,125,196 | A * | 9/2000 | Carey et al. | 382/138 |
| 6,171,002 | B1 * | 1/2001 | Momose et al. | 400/73 |
| 6,179,484 | B1 * | 1/2001 | Rodite | 382/135 |
| 6,259,829 | B1 * | 7/2001 | Bleecker et al. | 382/306 |
| 6,433,892 | B1 * | 8/2002 | Yoshida | 358/296 |
| 6,654,134 | B2 * | 11/2003 | Sakamoto et al. | 358/1.14 |
| 7,606,408 | B2 * | 10/2009 | Takiguchi | 382/139 |
| 7,657,473 | B1 * | 2/2010 | Meffie et al. | 705/35 |
| 7,689,025 | B2 * | 3/2010 | Takiguchi | 382/139 |
| 2004/0001187 | A1 * | 1/2004 | Fukusaka | 355/26 |
| 2005/0097046 | A1 * | 5/2005 | Singfield | 705/42 |
| 2005/0127182 | A1 * | 6/2005 | Nagata et al. | 235/454 |
| 2005/0281449 | A1 * | 12/2005 | Takiguchi | 382/139 |
| 2005/0286752 | A1 * | 12/2005 | Takiguchi | 382/139 |

* cited by examiner

*Primary Examiner* — Negussie Worku
(74) *Attorney, Agent, or Firm* — Honigman Miller Schwartz and Cohn LLP

(57) ABSTRACT

An automated document processing system is disclosed. The system includes a magnetic character reader located along a path of travel of a document. The system also includes a first image scanner located after the magnetic character reader along the path of travel, the first image scanner configured to capture an image of a first side of the document. The system further includes an endorser located after the magnetic character reader along the path of travel, where the endorser is configured to print an endorsement on at least one side of the document. The system also includes a second image scanner located after the endorser along the path of travel, the second image scanner configured to capture an image of the at least one side of the document endorsed by the endorser.

25 Claims, 6 Drawing Sheets

DOCUMENT PROCESSING SYSTEM HAVING IMPROVED OPERATIONAL SEQUENCING

CROSS REFERENCE TO RELATED APPLICATIONS

This application claims the benefit under 35 U.S.C. §119 of U.S. Provisional Patent Application Ser. No. 61/002,824, entitled DOCUMENT PROCESSING SYSTEM HAVING IMPROVED OPERATIONAL SEQUENCING, filed on Nov. 12, 2007, the entire contents of which are hereby incorporated by reference.

TECHNICAL FIELD

The present disclosure relates generally to document processing systems, such as check processing systems. In particular, the present disclosure relates to a document processing system having improved operational sequencing.

BACKGROUND 100 billion check-based transactions are made in the United States each year. Many of these check transactions are still cleared by physical processing and transporting of the original printed paper check. When checks are processed for payment, the routing and account information on the front of the check is read, and images are captured of the front and back sides of the check to capture information written on the check by a payor and any endorsements on the back of the check by the payee. Check processing systems at financial institutions do so by passing a large number of checks through large check processing systems to enter these checks into the financial systems computers for payment.

There is an increasing desire to place check processing systems at places of business, thereby allowing the business to digitize the information on the check. This eliminates the requirement that the business send the physical check to the source bank or other financial institution prior to getting paid, reducing transport delays. The drive to 'truncation', or reduction in transport time, has been accelerated by legislative measures in the United States and other nations. For example, the U.S. Check Clearing for the 21st Century Act 2003 (HR 1474 S1334), aka 'The Check 21 Act', which went into effect in October 2004, enacted legal frameworks and standards for the electronic interchange of digital facsimiles of original financial instruments within the U.S. However, existing check processing systems that digitize check content are large, expensive, and can be difficult to operate. These larger check processing systems, despite operating at a high rate of speed, need to move checks a large physical distance during processing, thereby increasing the latency of these machines and limiting throughput Recently, smaller and faster check processing systems, having shorter document travel distances, have been made which allow reading and scanning of checks to improve on these latency/throughput issues. However, these systems have limited functionality, in that they typically do not allow endorsement based on information discerned from the checks, do not allow endorsement of only successfully read checks, and do not scan or otherwise capture images relating to endorsements. Furthermore, these systems often will not accept variable-sized checks for reading, scanning, and endorsing.

For these and other reasons, improvements are desirable.

SUMMARY

In accordance with the present disclosure, the above and other problems are solved by the following:

In a first aspect, an automated document processing system is disclosed. The system includes a magnetic character reader located along a path of travel of a document. The system also includes a first image scanner located after the magnetic character reader along the path of travel, the first image scanner configured to capture an image of a first side of the document. The system further includes an endorser located after the magnetic character reader along the path of travel, where the endorser is configured to print an endorsement on at least one side of the document. The system also includes a second image scanner located after the endorser along the path of travel, the second image scanner configured to capture an image of the at least one side of the document endorsed by the endorser.

In a second aspect, an automated document processing system is disclosed. The system includes a magnetic character reader located along a path of travel of a document. The system also includes an endorser located after the magnetic character reader along the path of travel, where the endorser is configured to print an endorsement on at least one side of the document. The system further includes a parking location located after the magnetic character reader and before the endorser, the parking location providing a location to pause movement of the document before the document passes the endorser.

In a third aspect, a method of processing documents in a document processing device is disclosed. The method includes reading data on a printed document using a magnetic character reader, the printed document passing through the document processing device along a path of travel. The method also includes transmitting the data to a computing system, and receiving an instruction from the computing system regarding subsequent processing of the document based on the data. The method further includes, upon receiving the instruction, allowing the document to proceed along the path of travel to a sorting mechanism; and processing the document based on the instruction.

In a fourth aspect, a check scanning device is disclosed. The check scanning device includes a magnetic character reader located along a path of travel of a check and configured to read characters printed on a front side of a check. The device also includes a first image scanner located after the magnetic character reader along the path of travel, and configured to capture an image of a first side of the document. The device further includes an endorser located after the magnetic character reader along the path of travel, and configured to print an endorsement on at least one side of the document. The device also includes a parking location located after the magnetic character reader and before the endorser, which provides a location to pause movement of the document before the document passes the endorser. The device includes a second image scanner located after the endorser along the path of travel, configured to capture an image of the at least one side of the document endorsed by the endorser.

DETAILED DESCRIPTION

Figure 1:
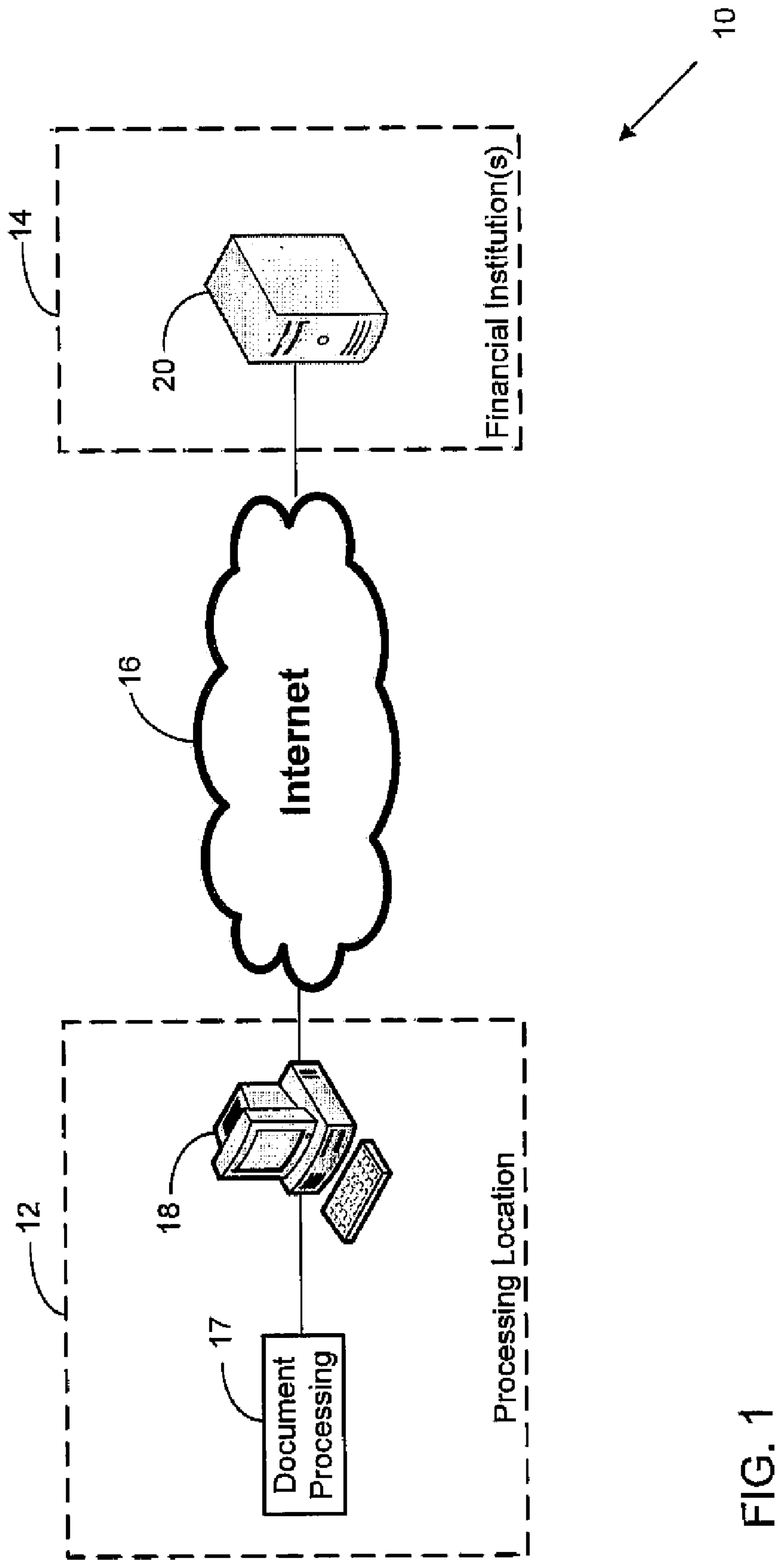
FIG. 1 is a schematic depiction of a network in which an electronic financial transaction may be placed, in accordance with the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to an automated document processing system. The system generally includes functionality to perform magnetic character reading and image capture of documents, such as checks. The system also includes capabilities to endorse and/or frank checks.

The document processing system of the present disclosure provides an automated method of information capture from checks or other documents. The document processing system, in general optimizes the layout of components to maximize throughput and minimize processing of erroneously placed checks, while minimizing the overall size and cost of the device. Such devices can be placed within various businesses or financial institutions to allow point-of-sale or near point-of-sale check processing.

One specific example of a system in which such a document processing system may be used is shown in FIG. 1. FIG. 1 illustrates a schematic view of a network 10 in which a financial transaction may take place, according to a possible embodiment of the present disclosure. The network 10 generally includes one or more document processing locations 12 and financial institutions 14, communicatively connected by a network, shown as the internet 16. A document processing location 12 may be any of a number of places of business at which a financial transaction may take processed, such as a location of a purchase or sale of goods and services, or another financial institution. Each document processing location 12 includes a document processing system 17 interconnected with a computing system 18. The document processing system 17 is arranged to provide the transaction location with the ability to electronically acquire information about a printed document, such as a check used for payment in exchange for goods and/or services. In certain embodiments, the document processing system 17 can include a check scanner and magnetic character reader, a printing device, and various sorting devices for capturing and/or printing information on one or both sides of a check. An example document processing system useable in the network 10 is described below in conjunction with FIG. 6.

The computing system 18 can be any of a number of types of computing systems, such as a general purpose personal computer, or a specialized computer such as a cash register or inventory system. The computing system 18 can interconnect with the document processing system 17 by any of a number of standard or specialized communication interfaces, such as a USB, 802.11a/b/g network, RF, infrared, serial, or other data connection. In certain embodiments, the computing system 18 runs an application configured to control the document processing system 17; in further embodiments, the computing system 18 receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing devices 18, 20 at different, specific locations are depicted, the computing devices and/or the document processing system 17 may be located at the same location or within the same network.

Figure 2:
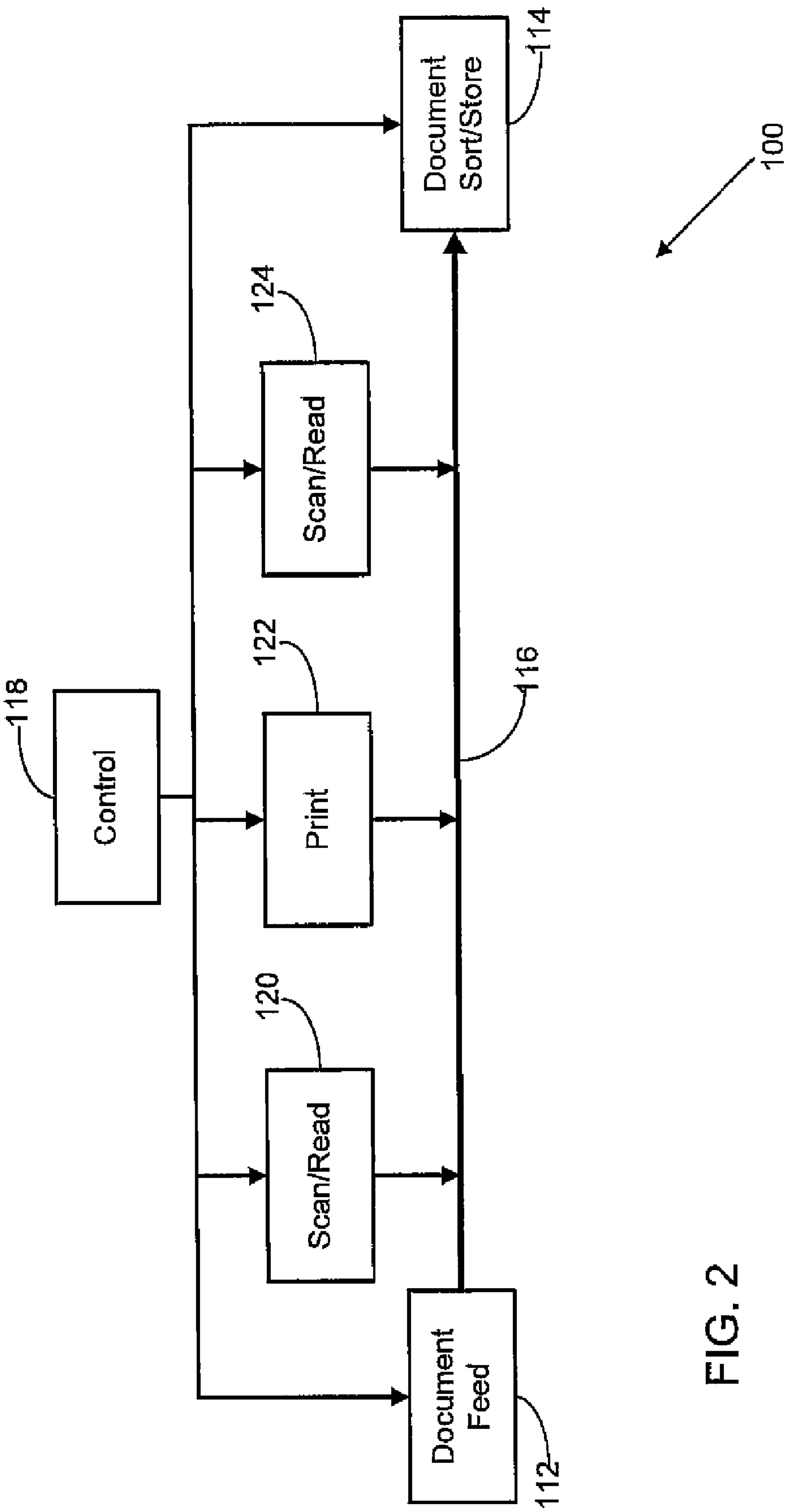
FIG. 2 is a schematic block diagram of an automated document processing system according to an embodiment of the present disclosure.

Referring now to FIG. 2, an automated document processing system 100 is shown in accordance with a possible embodiment of the present disclosure. The automated document processing system 100 provides an overview of the basic steps required to process documents, such as checks, in a high-volume system in which user supervision is minimized. The document processing system 100 can represent, for example, a possible embodiment of the document processing system 17 of FIG. 1.

In one embodiment, the automated document processing system 100 is a check processing system used to print and scan checks at a financial institution or document processing company. The automated document processing system 100 includes a document feeder 112 interconnected with a document sorter along a path of travel 116 of documents. The document feeder 112 is generally a document take-up mechanism provided with a large number of documents that are required to be processed. The document sorter 114 is an endpoint at which the documents have been processed, and can include one or more sorting mechanisms configured to arrange physical documents in a desired manner. The path of travel 116 may be defined by any of a number of document movement and/or guiding mechanisms, such as rollers, guides, or other systems able to grip and move documents from the feeder 112 to the sorter 114.

A control system 118 is interconnected to the document feeder 112 and the document sorter 114 to control flow of documents along the path of travel 116. The control system 118 can be an application level program configured to control flow and processing of documents. The control system 118 can reside on a general purpose or specific purpose computing system capable of communicating with the feeder 112 and sorter 114.

The control system 118 further directs a scanning system 120, a printing system 122, and a secondary scanning system 124. The scanning system 120 can scan one side of the documents passing along the path of travel 116, to store text and/or images displayed on the documents. The printing system 122 prints desired characters and/or images onto documents passing by the printing system along the path of travel 116. The printing system 122 can incorporate a print assembly which is configured to print from a stationary printing aperture onto moving documents passing by the printing system along the path of travel. In the example of a check processing system, the printing system 122 can print an endorsement onto the back of a check which is being processed at a financial institution operating the system 100. Other documents may be processed as well, by financial institutions or other document processing entities. The secondary scanning system 124 can scan and capture any information printed onto the documents by the printing system 122, thereby capturing initial and final states of the documents passing through the system 100.

Optionally (not shown), one or more document storage locations and/or exit points may lead from the path of travel 116 out from the system 100. These storage locations and exit points allow the control system an opportunity to pause documents along the path of travel 116, and to remove documents from the path of travel 116 prior to reaching the document sorter 114 in case of an error detected in scanning and/or printing. An example system incorporating such elements is described in greater detail below in conjunction with FIG. 6.

By passing documents through the automated document processing system 100, a large volume of documents can be printed and electronically captured, such that various records can be stored for each of a large number of documents. In the case of a financial institution processing checks or other documents, that institution can endorse a large number of checks, can capture check images and routing information, and can appropriately sort the document for distribution back to the issuing institution of the check.

Figure 3:
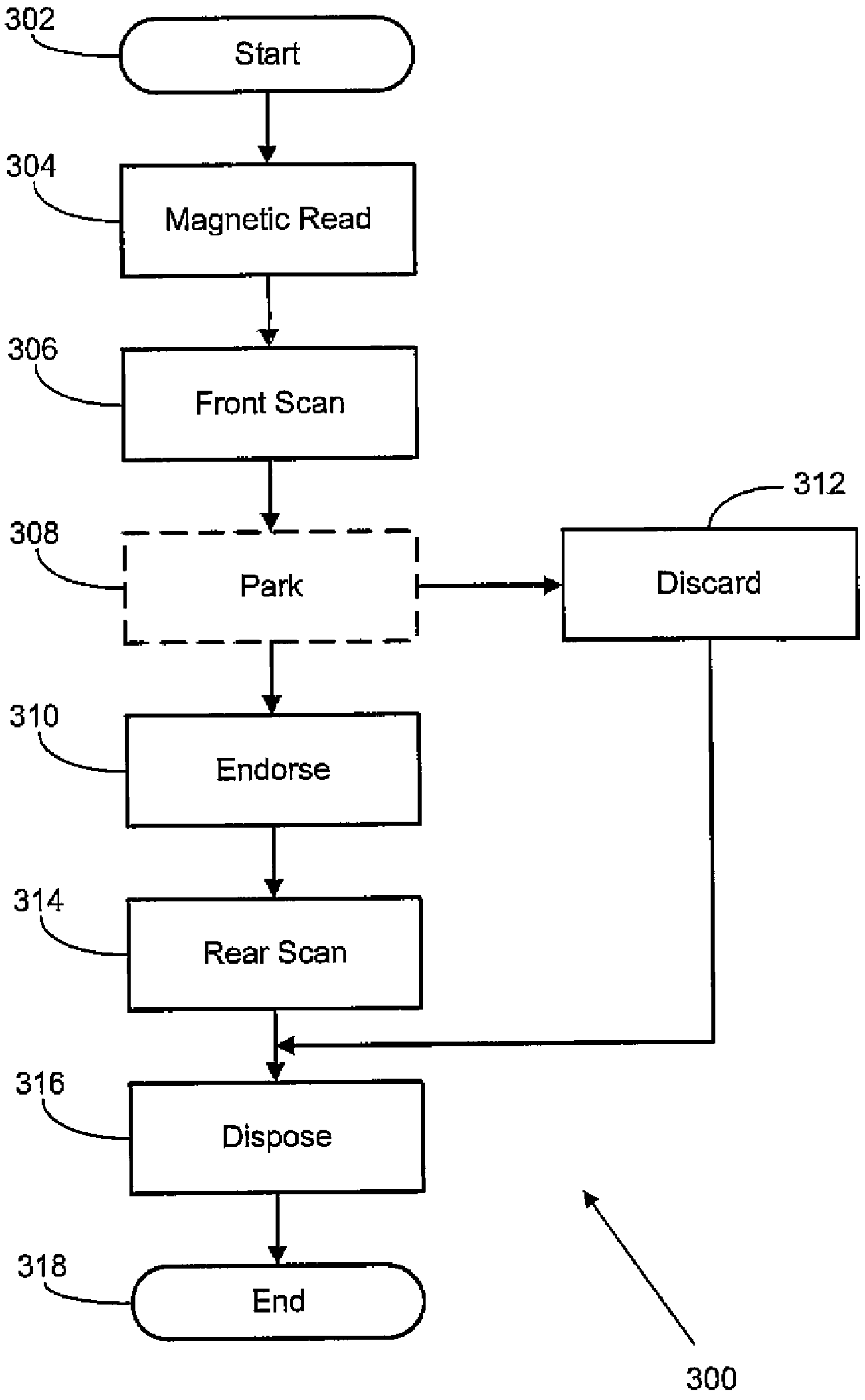
FIG. 3 is a flowchart of methods and systems for document processing according to a possible embodiment of the present disclosure.
Figure 4:
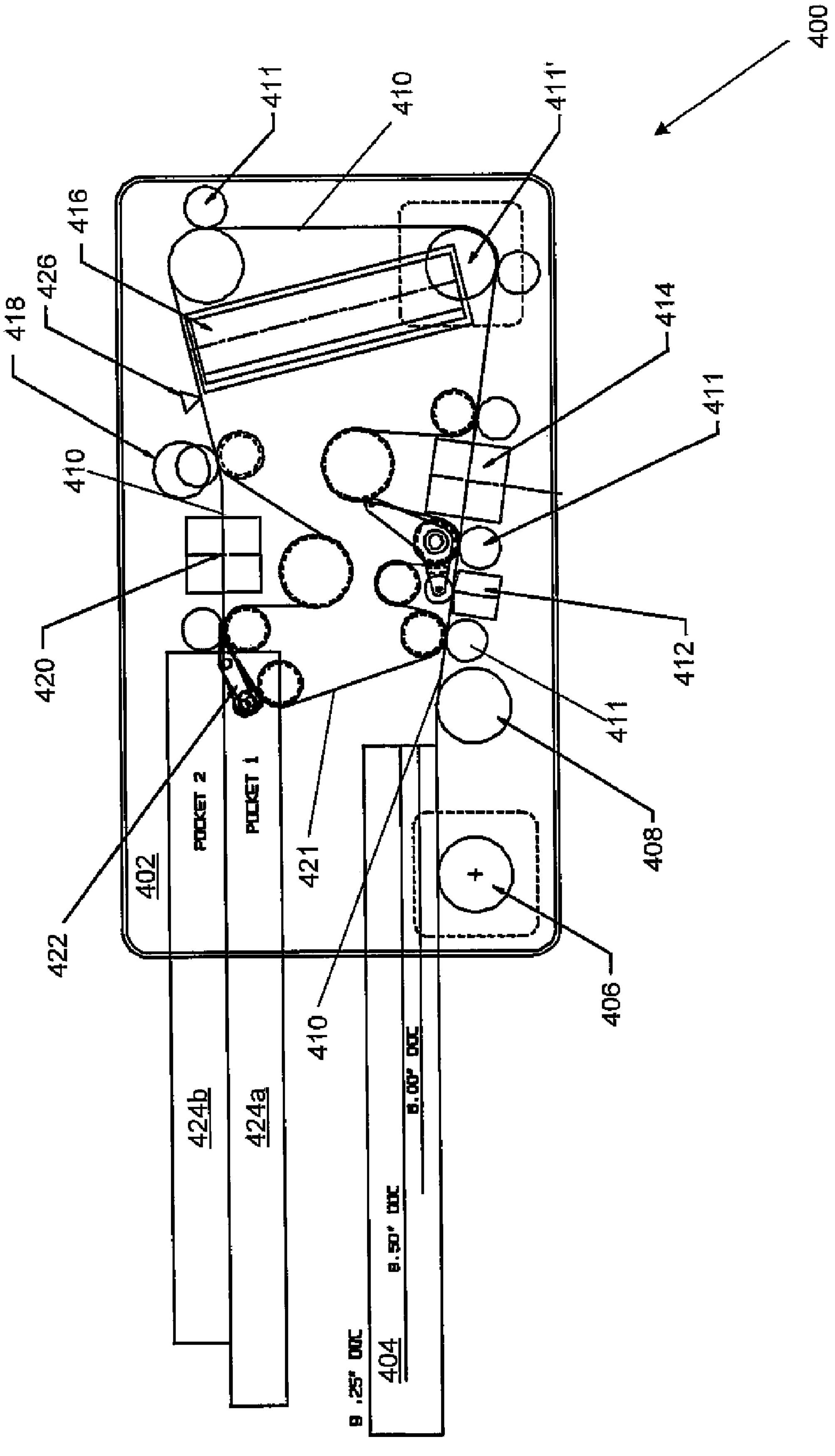
FIG. 4 is a side schematic view of a document processing system, according to a possible embodiment of the present disclosure.

Now referring to FIGS. 3-4, a specific implementation of the automated document processing system of the present disclosure is shown in which the operational principles described herein are implemented. FIG. 3 is a flowchart of methods and systems for document processing according to a possible embodiment of the present disclosure. The system 300 has a number of operational and timing considerations, which are discussed in conjunction with FIGS. 3-4; however, where not stated, no specific dependency in order of operations or operational modules is implied. The system 300 performs processes on a single check passing through an automated document processing system, such as the one shown in FIG. 2 or 4 herein. The system 300, in various embodiments, can be embodied in control circuitry of the document processing systems disclosed herein.

Operational flow within the system 300 is instantiated at a start operation 302, which corresponds to mechanical pick-up of a document, such as a check, to be fed into a path of travel of a document processing system. This pickup process can be performed by any of a number of types of mechanical rollers or other devices.

Operational flow proceeds to a magnetic character read module 304. The magnetic character read module induces magnetization on characters printed using a metallic/magnetic ink, and reads the characters by detecting a signature in the induced magnetization based on the shape of the character and the extent of the charge.

Operational flow proceeds to a first scan module 306. The first scan module 306 captures an image of the first side of the document. In certain embodiments, the first scan module 306 includes a contact image sensor scanning mechanism. In some embodiments of the present disclosure in which the document to be scanned is a check, the first scan module 306 scans a front side of the check to capture an image of the payment information, date, routing information, payee, payor, and other information needed to fully define the financial transaction involving the check. Other information can be gathered by the first scan module 306 as well.

Operational flow proceeds to a park module 308. The park module 308 provides an optional "parking" or stop location, for a document after that document is acted on by the magnetic character read module 304 and the first scan module 306. The park module 308 allows a delay to occur prior to resuming processing of the check, while the information collected by the earlier modules 304 and 306 is processed and validated.

The park module 308 exists in the system 300 because, in general, the system 300 will look to receive an indication that the magnetic character read module 304 and the first scan module 306 successfully captured information from the check or other document. These modules may not successfully execute because, for example, the check or other document is not oriented correctly (e.g. the document is upside down or inverted), or because the document format is unrecognized. Because this validation process may occur externally to the system (e.g. on a computing system communicatively connected to an automated document processing system, as shown in FIG. 1), the time required to receive this indication may be variable. Because the present disclosure contemplates taking a variety of actions in the subsequent modules based on the successful or unsuccessful outcome of execution of the magnetic character read module 304 and the first scan module 306 (as described below), the park module 308 allows the system 300 to delay passage of the document through an automated document processing system, thereby increasing the allowed time to make that decision.

If the system 300 receives an indication that the magnetic character read module 304 and the first scan module 306 have successfully captured data on the document, operational flow branches "OK" to an endorse module 310. The endorse module 310 endorses the document by printing or marking the document. In various embodiments of the present disclosure, the endorse module 310 includes a printing element configured to endorse the back of the document with a mark indicating that the document has been received and successfully read by the system 300. In the case of a check, the endorse module 310 endorses a particular region of the back of a check.

The endorse module 310 optionally also performs a franking operation on checks or other documents passing through an automated document processing system. In such instances, the endorse module 310 prints or marks on the front of the check an indication that the check has passed through the document processor. Various endorsing and franking operations can be used in combination, and are performed generally only on checks or other documents in which the modules 304, 306 are performed successfully using the system 300 of the present disclosure.

From the endorse module 310, operational flow proceeds to a second scan module 312. The second scan module 312 scans an endorsed or franked side of the document to capture the newly-added information printed onto the check. The Referring back to the park module 308, if the system 300 receives an indication that at least one of the magnetic character read module 304 and the first scan module 306 have not successfully completed, operational flow proceeds to a discard module 314. The discard module 314 causes the endorse module 310 and the second scan module 312 to be inactive, thereby preventing erroneously-read documents from being endorsed, franked, or scanned by these "downstream" modules of the document processing system.

From the rear scan module 310 or the discard module 314, operational flow proceeds to a dispose module 316. The dispose module 316 selects a location to dispose the document operated on by the system, and actuates a mechanism to direct the document to that location. The dispose module 316 generally disposes the documents into two different "pockets" using a sorting mechanism, a "completed" pocket and a "rejected" or "error" pocket. The completed pocket corresponds to completed processing of a document by the system, including successful reading and scanning by the magnetic character read module 304 and the first scan module 306. The rejected pocket corresponds to completed processing of the document, but detection of an error in one or both of the magnetic character read module 304 and the first scan module 306. A user of the system can collect the documents sorted into the rejected pocket by the dispose module 316 and pass those documents through the document processing system again, oriented properly.

Operational flow terminates at an end module 318. The end module 318 corresponds with completed travel of a document along the path of travel to a sorting pocket. In certain embodiments, the end module 318 corresponds to passing the document out of the document processing system to an end position along a path of travel of the document.

FIG. 4 is a schematic view of a document processing system 400, according to a possible embodiment of the present disclosure. The document processing system 400 works in conjunction with a computing system, as shown above in FIG. 1, to provide automated document processing for a variety of types and sizes of documents, such as checks. Optionally, the system 400 of FIG. 4 can be directed by control logic for performing the various methods and systems disclosed in FIG. 3, above.

The document processing system 400 includes a housing 402 having a document intake tray 404 extending therefrom. The housing 402 is a compact system, generally sized to fit on a tabletop. In one embodiment, the housing 402 is approximately ten inches wide by approximately six inches deep. The intake tray 404 can hold a variety of sizes of documents that can be processed by the system 400 overall. In the embodiment shown, up to 100 documents of sizes between 4.5 inches and 9.25 inches in length can be accepted by the system 400 without modification or relocation of components within the system. In alternative embodiments, a different number or size of documents could be accommodated by the tray 404.

A document intake mechanism, such as a feeder nip, including a nudger wheel 406 and a separator wheel 408, is located within the housing 402 proximate to the intake tray 404, and acts to grip and pull one document at a time into the system 400 for processing. The nudger wheel 406 moves a number of documents at the bottom of the intake tray 404 toward the separator wheel 408, which grips the bottommost document and feeds it toward a path of travel 410 of a document passing through the system 400.

The path of travel 410 routes each document past a variety of check processing components, including a magnetic character reader 412, a front image scanner 414, an endorser 416, a franking roller 418, and a rear image scanner 420. Operation and placement of these components is described below. The path of travel 410 is defined by a plurality of rollers 411 connected by a drive linkage 421. The rollers 411 are generally placed in opposed pairs to rotate and guide documents along the path of travel 410. The drive linkage 421 connects at least one roller from each pair (as well as intermediate rollers 411 used to route the linkage 421 around the various components 412, 414, 416, 420), and causes each of the rollers to rotate at a uniform rate. The uniform rotation speeds of the rollers results in moving the documents along the path of travel 410 at a constant speed. One of the rollers 411, in the embodiment shown as roller 411', is a drive roller causing movement of the drive linkage 421 and thereby causes the uniform rotation of the other rollers 411.

The magnetic character reader 412 scans magnetic characters located in front of the reader. The reader 412 generally resides adjacent to a magnet, which induces a magnetic charge on characters printed in a magnetizable ink. The data gathered by the magnetic character reader 412 can be combined with position or speed information to transform the data collected into a signal which is matched to a signature signal representing alphanumeric characters or symbols, thereby allowing translation to digitized characters. In one example, the reader 412 charges and reads magnetic printing representing routing and account information that are printed on checks, deposit slips, or other similar documents.

The reader 412 is located at a position immediately following intake of documents from the intake mechanism, to allow the reader to obtain the character data and to allow the system 400 to transmit that data to a communicatively connected computing system as early in the document processing process as possible. This allows a maximum amount of time after reading the characters for the linked computing system to determine whether the system 400 successfully captured the magnetic ink characters on the document, limiting the number of instances in which the system 400 needs to pause while awaiting a response from the computing system.

The front image scanner 414 includes a linear scan element which can be used to scan an image of a document placed under it. The image scanner 414 is passed across a front surface of a document, such as a check. The data gathered by the front image scanner 414 can be combined with position or speed information to transform data collected into an image of one side (e.g. the front side) of a document.

The front image scanner 414 is positioned immediately following the magnetic character reader 412 along the path of travel of the document. Data from the front image scanner 414 can also be validated by a computing system communicatively connected to the system 400, and therefore the scanner 414 is placed in an early position along the path of travel 410 of the document. In an alternative embodiment to the one shown, the front image scanner 414 can be placed before the magnetic character reader 412.

The endorser 416 is placed after the scanner 414 along the path of travel, and generally includes a printing element oriented toward the rear side of the document. The endorser 416 prints one or more characters onto the document such as the name of the institution receiving the check for processing, the time at which the check is processed, or other information. In certain embodiments, the endorser 416 can print at least a portion of the information captured by the magnetic character reader 412 or the front image scanner 414. The endorser 416 is generally activated after an indication of successful reading of characters by the magnetic character reader 412 is received from a computing system external to the document processing system 400. Because the time needed by the external computing system may vary, the system 400 is designed to place the reader 412 as far away from the endorser as possible to maximize the time in which this determination can take place. Furthermore, a parking location can be incorporated into the system 400, as described below, to provide additional time to the external computing system while ensuring that the document does not pass by the endorser prior to receiving some indication from the computing system.

The endorser 416 can print different information on the document based on the received indication of successful reading of characters, or can be programmed to not print at all on a document that has not been read successfully. In a further embodiment, the endorser is activated only after an indication of successful reading by the magnetic character reader 412 and the scanner 414. Other embodiments are possible as well, such as embodiments in which information is printed onto the front side of the document as well.

The franking roller 418 presses against one of the rollers 411 of the drive mechanism of the system 400, and places a mark on the front side of documents as they pass along the path of travel 410 through the document processing system 400. The franking roller 418 can provide any of a number of types of franking marks onto the document as it passes along the path of travel. The franking roller is configured such that it can be retracted from the path of travel 410 in the instance that the check passing through the path of travel was not successfully read by the magnetic character reader 412 or the front image scanner 414.

The rear image scanner 420 is analogous to the front image scanner 414, but captures an image of the rear side of the document, including any endorsement printed thereon. In the embodiment shown, the rear image scanner is placed after the franking roller 418 and endorser 416 along the path of travel 410. The placement of the scanner 420 a distance from the endorser 416 allows any ink from the endorser time to dry prior to being contacted by the rear image scanner. Therefore, the rear image scanner 420 is generally not immediately adjacent to the endorser 416, although various embodiments may alter the position and ordering of components.

A sorting mechanism 422 is placed at the end of the path of travel 410 in the system, in the embodiment shown following the rear image scanner 420. The sorting mechanism 422 is actuated to sort the documents passed through the document processing system into one of a number of document output pockets 424. In the embodiment shown, two document output pockets 424*a-b* are illustrated. In various embodiments of the system 400, the two document output pockets 424*a-b* can receive documents sorted according to any of a number of sorting algorithms. For example, in a possible embodiment, the first document output pocket 424*a* receives successfully processed documents. A successfully processed document has successfully had the magnetic characters printed on its front surface read, and has had images captured of its front and rear surfaces. It may also optionally have been endorsed and/or franked to indicate successful receipt by a payee or institution holding the document. In such an embodiment, the second document output pocket 424*b* receives documents that have not been successfully processed, in that an image or character data could not be detected or some error occurred during processing. These documents are routed to the document output pocket 424*b* by the sorting mechanism 422. In a further embodiment, the software and/or control logic driving the sorting mechanism routs the successfully processed documents to output pocket 424*b* and the erroneously processed documents to output pocket 424*a*. Other sorting schemes are possible as well, and are directed by software and/or control logic directing operation of the sorting mechanism 422.

A parking station 426 resides along the path of travel 410 after the front image scanner 414. The parking station 426 provides a location within the system 400 in which a document can optionally be held in place (not moving) while the system 400 awaits an indication from a communicatively connected computing system (such as the computing system 18 of FIG. 1 or integrated logic within the system 400) that image and/or character data has been successfully read by the magnetic character reader 412 and/or the front image scanner 414. The parking station 426 resides within the system 400 along the path of travel 410 prior to any of the components whose action may depend upon the outcome of the computing system's determination of success/failure of the reader 412 and/or scanner 414. As shown, the parking station 426 causes a document to stop at a position prior to passing the endorser 416, franking roller 418, and rear image scanner 420 (i.e. the components of the system which may or may not execute depending upon receipt of confirmation of successful operation of the magnetic character reader 412 and/or front image scanner 414.

Multiple documents can pass along the path of travel at any one time. However, the magnetic character reader 412, front image scanner 414, endorser 416, and image scanner 420 generally must operate on each document in a non-stop process; therefore, any document should not reach the parking station 426, or be accelerating from or decelerating toward the parking station, while a trailing portion of the document is still passing by one of these components. Therefore, the parking station 426 must reside within a length of the path of travel 410 sufficiently long to allow substantially the entire document to reside within the path of travel without the document being halted or the document's speed changed during a scanning, reading, or endorsing operation.

Specifically, the trailing edge of the document must bypass the magnetic character reader 412 and the front image scanner 414, prior to a portion of the document passing the endorser 416 that is to be endorsed. In the embodiment shown, the leading edge of any document positioned in the parking station 426 will come to a stop at a position such that approximately one inch of the document has bypassed the endorser. Therefore, one inch of the document will not be able to be endorsed; however this is only to minimize the length of the path of travel 410, and to allow the endorser 416 to endorse the document differently based on the information obtained from the reader 412 and image scanner 414.

In further embodiments, an additional inch can be added to the length of the path of travel 410, lengthening the distance between the scanner 414 and the endorser 416, allowing the entire longest possible document (in the embodiment shown, 9.25 inches) to fit between the scanner and endorser, allowing the system to endorse any portion of the document after the document passes the scanner 414 and reader 412.

Figure 5:
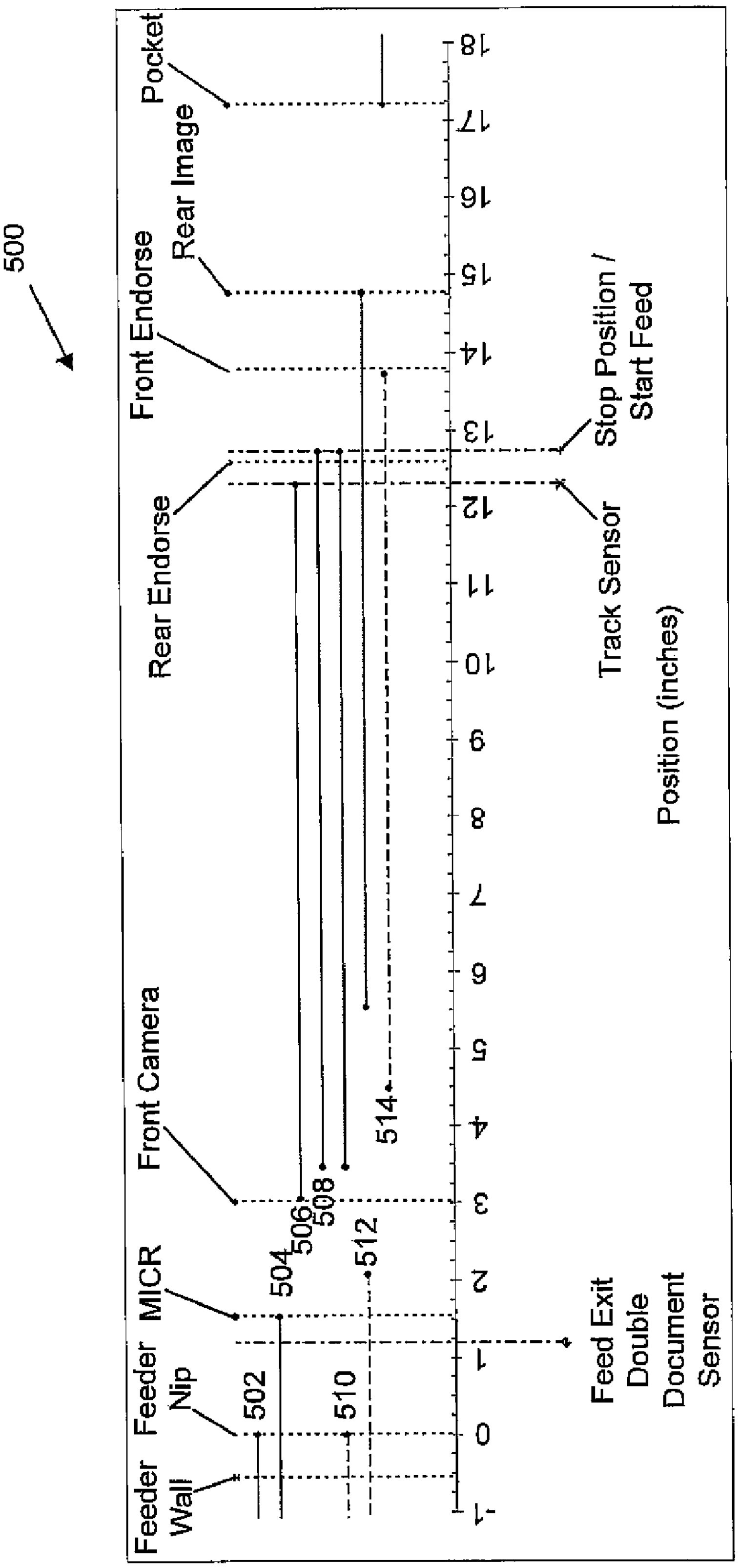
FIG. 5 illustrates an example document flow through the document processing system of FIG. 4.
Figure 6:
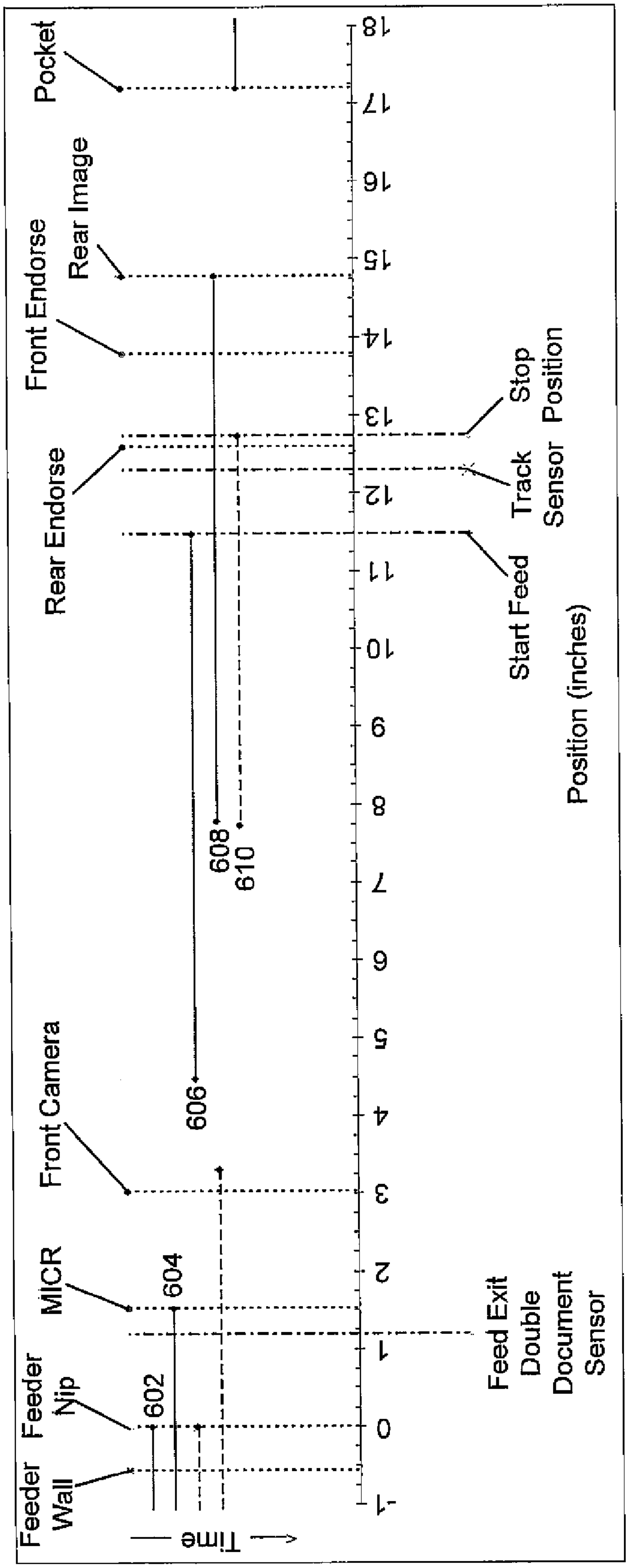
FIG. 6 illustrates a second example document flow through the document processing system of FIG. 4.

FIGS. 5-6 illustrate document flows through the document processing system of FIG. 4. These document flows are illustrated by "snapshots" of document positions at various periods during a document processing timeline 500, 600, respectively, as the document pass along the path of travel 410 and past the various components of the document processing system 400 described above. In these Figures, a first document, called "Document A", is represented by the solid horizontal lines, and a second document, called "Document B", is represented by dashed horizontal lines. In the Figures, time progresses forward as the "snapshots" of the document positions progress downward toward the positional axis. In FIG. 5, Document A represents the longest possible document supported within the document processing system. In that Figure, the topmost row, representing a first time period 502, illustrates Document A initially received into a document processing system by being drawn into the system by a feeder nip or document intake system. The second time period (second row) 504 shows Document A advancing through to the magnetic character reader 412, out from the document feeder. The third time period 506 shows Document A after it has passed the front image scanner 414. In this position, the document processing system has a complete image and has read all of the magnetic characters on the document. The fourth time period 508 shows Document A at the parking station, which resides at a position such that the trailing end of Document A has bypassed the front image scanner 414 and that the document can be decelerated from its constant speed (i.e. the speed at which it passes from the first time period 502 to the third time period 506) to the parking station.

The fifth time period 510 illustrates Document A in the same position as in the fourth time period 508, but with a second document, Document B received into the beginning of the path of travel. The sixth time period 512 illustrates the positions of Documents A and B in motion, with Document A having been endorsed on the rear by the endorser 416 and on the front by the franking roller 418, and having just reached the rear image scanner 420. Document B, traveling at the same rate as Document A, maintains the same distance between the two documents as illustrated in the fifth time period 510. In the embodiment shown, Document B has partially passed the magnetic character reader 412, and is moving toward the front image scanner 414. The seventh time period 514 illustrates Document A after it has exited the path of travel 410, and reached one of the pockets 424*a-b*. Document B, maintaining the same distance behind Document A, has reached the franking roller 418, having partially passed the endorser 416. At this point, Document A is disengaged, and Document B can move independently of Document A. Any subsequent documents to Document B would exhibit similar spacing between those documents and Document B as that document exhibits with respect to Document A.

Within the document processing system 400, each document moves along the path of travel at the same rate. Furthermore, certain operations, such as reading characters, scanning, or endorsing, cannot be interrupted once started. Therefore, the various time periods of FIG. 5 illustrate that the distance between the trailing end of Document A and the beginning end of Document B represents a distance such that while either document is at the parking station, the other document will not be passing by a character reading, scanning, or endorsing element that cannot be interrupted during operation. In the embodiment shown, the distance between Document A and Document B is such that while Document A is at the parking station, Document B cannot enter the path of travel of the system. Similarly, as Document A passes by the parking station, Document B will not be stopped until it would reach the parking station, a time at which Document A has exited the path of travel completely.

FIG. 6 illustrates a further document flow through the document processing system of FIG. 4. FIG. 6 illustrates four time periods of use of the system 400 using differently sized documents. FIG. 6 generally illustrates an analogous process to the one shown in FIG. 5, but shows that when documents that are shorter than the maximum length supported by the system 400 are processed, a document need not fully reach the parking station 426 prior to feeding a second document into the path of travel 410. The process 600 shown includes a first time period 602, which illustrates initial intake of Document A into the document intake mechanism, described as a "feeder nip". The second time period illustrates progress of Document A into the path of travel, such that the leading edge has reached the magnetic character reader 412. At this position, Document A is in motion, and to ensure successful operation of the magnetic character reader 412 and front image scanner 414, Document A will progress past those components along the path of travel at a constant rate of speed.

The third time period 606 shows Document A in continued motion, it having not yet reached the parking station 426. However, in contrast to the example of FIG. 5, because Document A in this case is a shorter document than the maximum allowed, Document B can be introduced along the path of travel by the feeder nip once the trailing end of Document A bypasses the front image scanner 414 by a sufficient length. Document B will not reach the magnetic image reader 412 by the time Document A reaches the parking station 426, and therefore it can be stopped prior to the reader 412 when Document A reaches the parking station 416 if the indication of successful operation of the reader 412 and scanner 414 has not yet been received with respect to Document A.

The fourth time period 608 illustrates a leading end of Document A having reached the rear image scanner 420, and a leading end of Document B having just passed the front image scanner 414. As is seen best in this time period, approximately 4 inches separate the two documents. The fifth time period 610 illustrates Document A reaching one of the pockets 424*a-b*, with a leading end of Document B again having passed the endorser 416 and approaching the franking roller 418.

Although FIGS. 5-6 illustrate two possible combinations of lengths of documents passing through the system 400 of FIG. 4, it is understood that additional embodiments are possible as well in which different document spacings may be used. In one example, additional space is provided between the documents received into the system. It is understood that additional spacing between documents will have an adverse effect on throughput, other variables being held constant. Additionally, the spacings and ordering among the various components of the system 400 may be altered as well, as described above.

Furthermore, although the present disclosure is discussed in conjunction with a compact document processing system, and in particular a system for processing checks, it is understood that the same operational principles apply in larger systems, or systems that process other types of documents.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An automated document processing system comprising:

a magnetic character reader located along a path of travel of a document;

a first image scanner located after the magnetic character reader along the path of travel, the first image scanner configured to capture an image of a first side of the document;

an endorser located after the magnetic character reader along the path of travels the endorser configured to print an endorsement on at least one side of the document;

a second image scanner located after the endorser along the path of travel, the second image scanner configured to capture an image of the at least one side of the document endorsed by the endorser.

2. The automated document processing system of claim 1, further comprising a parking position located after the first image scanner.

3. The automated document processing system of claim 2, wherein the parking position provides a location for the document to pause along the path of travel prior to being endorsed by the endorser.

4. The automated document processing system of claim 1, further comprising a framing device located after the parking position along the path of travel.

5. The automated document processing system of claim 1, further comprising control logic configured to transmit data received from the magnetic character reader to a computing system.

6. The automated document processing system of claim 5, wherein the control logic receives response information from the computing system.

7. The automated document processing system of claim 5, wherein the control logic is further configured to transmit image data received from at least one of the first and second image scanners to the computing system.

8. The automated document processing system of claim 1, further comprising a sorting mechanism configured to select one of a plurality of document output pockets.

9. An automated document processing system comprising:

a magnetic character reader located along a path of travel of a document;

an endorser located after the magnetic character reader along the path of travel, the endorser configured to print an endorsement on at least one side of the document; and a parking location located after the magnetic character reader and before the endorser, the parking location providing a location to pause movement of the document before the document passes the endorser.

10. The automated document processing system of claim 9, further comprising an image scanner located after the magnetic character reader along the path of travel, the image scanner configured to capture an image of a first side of the document.

11. The automated document processing system of claim 10, wherein the endorser is configured to print an endorsement on at least one side of the document based on data obtained from the image scanner.

12. The automated document processing system of claim 9, wherein the endorser is configured to print an endorsement on at least one side of the document based on data obtained from the magnetic character reader.

13. The automated document processing system of claim 9, further comprising a second image scanner located after the endorser along the path of travel, the second image scanner configured to capture an image of the at least one side of the document endorsed by the endorser.

14. The automated document processing system of claim 9, further comprising a sorting mechanism configured to select one of a plurality of document output pockets.

15. The automated document processing system of claim 14, wherein the sorting mechanism selects the one of a plurality of document output pockets based at least on successful acquisition of data using the magnetic character reader.

16. The automated document processing system of claim 9, further comprising a length determination mechanism located proximate to the magnetic character reader and capable of detecting the length of a document passing along the path of travel.

17. The method of claim 16, further comprising franking the processed document.

18. A method of processing documents in a document processing device, the method comprising:

reading data on a printed document using a magnetic character reader, the printed document passing through the document processing device along a path of travel;

transmitting the data to a computing system;

receiving an instruction from the computing system regarding subsequent processing of the document based on the data;

upon receiving the instruction, allowing the document to proceed along the path of travel to a sorting mechanism; and processing the document based on the instruction.

19. The method of claim 18, further comprising, prior to receiving the instruction, parking the document located after the magnetic character reader along the path of travel.

20. The method of claim 18, wherein processing the document comprises:

endorsing the document; and scanning the endorsed document.

21. The method of claim 18, wherein processing the document comprises routing the document to a rejected document pocket.

22. A check scanning device comprising:

a magnetic character reader located along a path of travel of a check, the magnetic character reader configured to read characters printed on a front side of a check;

a first image scanner located after the magnetic character reader along the path of travel, the first image scanner configured to capture an image of a first side of the document;

an endorser located after the magnetic character reader along the path of travel, the endorser configured to print an endorsement on at least one side of the document;

a parking location located after the magnetic character reader and before the endorser, the parking location providing a location to pause movement of the document before the document passes the endorser; and a second image scanner located after the endorser along the path of travel, the second image scanner configured to capture an image of the at least one side of the document endorsed by the endorser.

23. The check scanning device of claim 22, wherein the device accommodates a plurality of sizes of checks.

24. The check scanning device of claim 22, further comprising a sorting mechanism configured to select one of a plurality of document output pockets.

25. The check scanning device of claim 24, wherein the sorting mechanism selects the one of a plurality of document output pockets based at least on successful reading of data using the magnetic character reader.

* * * * *

UNITED STATES PATENT AND TRADEMARK OFFICE

CERTIFICATE OF CORRECTION

PATENT NO. : 8,098,391 B2
APPLICATION NO. : 12/140369
DATED : January 17, 2012
INVENTOR(S) : Michael J. Kiplinger et al.

It is certified that error appears in the above-identified patent and that said Letters Patent is hereby corrected as shown below:

Please correct Claim 1 as follows:

At column 12, claim number 1, line number 55, delete the word “travels” and add -- travel, --.

Please correct Claim 4 as follows:

At column 13, claim number 4, line number 2, delete the word “framing” and add -- franking --.

Signed and Sealed this
Tenth Day of April, 2012

David J. Kappos
*Director of the United States Patent and Trademark Office*